(12) United States Patent
Manfred

(10) Patent No.: US 7,586,334 B2
(45) Date of Patent: Sep. 8, 2009

(54) CIRCUIT ARRANGEMENT AND METHOD FOR PROCESSING A DUAL-RAIL SIGNAL

(75) Inventor: Roth Manfred, Munich (DE)

(73) Assignee: Infineon Technologies AG (DE)

( * ) Notice: Subject to any disclaimer, the term of this patent is extended or adjusted under 35 U.S.C. 154(b) by 16 days.

(21) Appl. No.: 11/391,666

(22) Filed: Mar. 27, 2006

(65) Prior Publication Data

US 2006/0261858 A1 Nov. 23, 2006

Related U.S. Application Data

(63) Continuation of application No. PCT/DE2004/002133, filed on Sep. 24, 2004.

(30) Foreign Application Priority Data

Sep. 25, 2003 (DE) ................................ 103 44 647

(51) Int. Cl.
*H03K 19/082* (2006.01)
*G11C 8/00* (2006.01)
*H03K 19/094* (2006.01)

(52) U.S. Cl. .......................... 326/105; 326/93; 326/108

(58) Field of Classification Search ................. 326/104, 326/105, 112, 114, 113, 119, 106, 108, 95–98, 326/121, 115
See application file for complete search history.

(56) References Cited

U.S. PATENT DOCUMENTS 3,859,513 A * 1/1975 Chuang et al. .............. 714/797

| | | | | |
|---|---|---|---|---|
| 5,550,490 A * | 8/1996 | Durham et al. ............... 326/98 |
| 5,880,609 A * | 3/1999 | Klass et al. .................... 326/93 |
| 6,069,510 A | 5/2000 | Keeth |
| 6,133,761 A | 10/2000 | Matsubara |
| 6,225,826 B1 | 5/2001 | Krishnamurthy et al. |
| 6,236,240 B1 * | 5/2001 | Hill .............................. 326/98 |
| 6,781,420 B2 * | 8/2004 | Zhang ......................... 326/115 |
| 2004/0223383 A1 * | 11/2004 | Kunemund .................. 365/200 |
| 2005/0213757 A1 * | 9/2005 | Kunemund ................... 380/44 |

FOREIGN PATENT DOCUMENTS

WO    WO 01/55821 A2    8/2001

* cited by examiner

*Primary Examiner*—Rexford N Barnie
*Assistant Examiner*—Crystal L Hammond
(74) *Attorney, Agent, or Firm*—Dickstein, Shapiro, LLP.

(57) ABSTRACT

The present invention relates to a circuit arrangement for processing a dual-rail signal, comprising data inputs for feeding at least one dual-rail data input signal, and respective data outputs for outputting a dual-rail data output signal using the at least one dual-rail data input signal. The circuit arrangement is designed in such a way that a dual-rail output signal with physical values corresponding to the physical values of the data input of the dual-rail data input signal is output at the data outputs when the dual-rail data input signal is fed to the data inputs with the same physical values for at least one signal pair.

15 Claims, 2 Drawing Sheets

| A | B | Z |
|---|---|---|
| 0 | 0 | 0 |
| 0 | 1 | 0 |
| 1 | 0 | 0 |
| 1 | 1 | 1 |

|  | A | AN | B | BN | Z | ZN |
|---|---|---|---|---|---|---|
| Pre-Discharge | 0 | 0 | 0 | 0 | 0 | 0 |
| AB=0/0 | 0 | 1 | 0 | 1 | 0 | 1 |
| AB=0/1 | 0 | 1 | 1 | 0 | 0 | 1 |
| AB=1/0 | 1 | 0 | 0 | 1 | 0 | 1 |
| AB=1/1 | 1 | 0 | 1 | 0 | 1 | 0 |

CIRCUIT ARRANGEMENT AND METHOD FOR PROCESSING A DUAL-RAIL SIGNAL

CROSS-REFERENCE TO RELATED APPLICATIONS

This application is a continuation of International Application No. PCT/DE2004/002133 filed on Sep. 24, 2004, which claims priority to German Patent Application Serial No. 10344647.8, filed on Sep. 25, 2003; both these documents are incorporated herein by reference in their entireties.

BACKGROUND OF THE INVENTION

The present invention relates to a circuit arrangement and a method for processing a dual-rail signal.

Switching networks are normally designed microelectronically such that each bit of the information to be processed is physically represented by one, and only one, electrical node. A configuration such as this is also denoted as single-rail circuit technology. Such switching networks are, however, relatively insecure with regard to attacks with the aid of so-called differential current profile analysis, which is applied by unauthorized third parties when attempting to access secret information. Differential current profile analysis, which is also denoted as differential power analysis—DPA, is one of the most important methods, for example, for attacking smart cards for security applications. This involves a deliberate attack on confidential information such as passwords or cryptographic keys. For a given program or a given algorithm, smart card current profiles which are measured by means of statistical methods, and/or their charge integrals calculated over one or more clock cycles are evaluated, in which case—for a multiplicity of program runs—it is possible to draw conclusions about the information to be protected from the correlation between systematic data variation and respective charge integral.

In contrast to conventional single-rail circuit technology, in which each bit within a data path or signal path is physically represented by one, and only one, electrical node K, an implementation using dual-rail circuit technology results in each bit being represented by two nodes K and KN, each bit having a valid logic value when K corresponds to the true logic value of this bit, and KN corresponds to the negated value.

Thus, when the value "1" is intended to be transmitted, this is done by means of a "1" in the node K. At the same time, however, the value "0" is transmitted at the node KN, so that, overall, both a "1" and a "0" are thus transmitted. When the value "0" is to be transmitted, a "0" is transmitted at the node K and a "1" at the node KN. In both cases, a "1" and a "0" are thus transmitted. Assuming that the nodes K and KN are physically identical, it is now no longer possible to use differential current profile analysis to identify whether a "1" or a "0" is being transmitted as the data item. However, this is true only when a signal change actually takes place for each transmitted data item, that is to say when the information "1" and the information "0" alternate. If a number of identical data items are transmitted successively, the characteristics with regard to the capability for attacks by means of differential current profile analysis deteriorate.

In order to repulse cryptoanalytical attacks, it is known to achieve the desired invariance of the charge integrals by inserting between two respective states with valid logic values <1, 0> or <0, 1> a so-called precharge state, also referred to just as precharge, for which both K and KN are charged to the same electrical potential, that is to say they assume logically invalid values <1, 1> or <0, 0>. A state sequence for the precharge state <1, 1> would appear, for example, as follows:

(1,1)→(0,1)→(1,1)→(1,0)→(1,1)→(1,0)→(1,1)→(0, 1)→...

In an integrated circuit, this precharge is generally produced globally and fed in a star-shaped and clock-synchronized fashion to the dual-rail circuits, which operate with precharge. In the individual dual-rail circuits, it is, of course, also possible to produce an appropriate precharge locally.

FIG. 1 shows the time profile of a signal S that is processed by means of a conventional dual-rail circuit with predischarge and is transmitted in coded fashion by means of two complementary lines S1, S2. At the start of a clock cycle X of a clock signal CLK, the two complementary lines S1, S2 are precharged in a first clock phase X1, in the so-called predischarge phase, such that they assume logic value "0", as a result of which previously stored information is deleted. Since the data signal S to be transmitted has the logic value "0", the line S2 is precharged to the value of a logic "1" in a second clock phase X2, the so-called evaluation phase. With the following clock phase Y, the data signal S changes from logic "0" to logic "1". At the start of the clock cycle Y of the clock signal CLK, it is necessary in a first clock phase 1 to precharge the two complementary lines S1, S2 once again to a logic "0". In order for the signal S to assume the logic value "1", the line S1 is precharged in a second clock phase Y2 to the logic value "1". An analogous procedure affects the following clock cycles, it basically being the case that at the start of each clock cycle the lines S1, S2 are precharged to logic "0" and subsequently one of the lines S1, S2 is charged to logic "1" as a function of the logic value of the signal S to be driven.

There is the disadvantage in the case of dual-rail circuit technologies with pre-discharge or pre-precharge that the power consumption is relatively high and that inflexible, customer-specific solutions are involved, since the circuit design cannot be calculated automatically, that is to say it cannot be synthesized.

Furthermore, it is not necessarily possible to achieve a desired signal output value reliably by means of a precharge of a dual-rail circuit. Propagation time differences of input signals of such a circuit can cause undesired intermediate transitions at the output of the circuit.

A circuit has, for example, the AND logic function Z=A+B, the aim being for the result Z to be equal in each case to "0" for a first signal pair A, B with the values <A="1" and B="0">, as well as for a second signal pair A, B with the values <A="0" and B="1">. On the basis of a propagation time difference of the signals of the second signal pair, it is possible upon a transition of the values of the first signal pair to the values of the second signal pair for a further signal pair to be set, for example, with the values <A="1" and B="1"> such that the result Z="1" is set briefly at the output. This yields at the output a rising edge, a so-called hazard, that is actually precluded from occurring and causes an undesired intermediate state. The superfluous signal changes associated with these intermediate states signify in physical terms that respective electrical capacitors must unnecessarily be recharged, an increased energy turnover being required as a result. Moreover, the current profile of the circuit depends strongly on the input data respectively to be processed, and so the circuit overall is susceptible to a differential current profile analysis despite the dual-rail technology with precharge.

Further known measures for reducing the capability for attacks by means of differential current profile analysis are coded computing or secure coding. However, in this case there is a need for additional clock cycles as well as a large quantity of random numbers, something which entails a large expenditure of area in addition to a reduced operating speed.

BRIEF SUMMARY OF THE INVENTION

A circuit arrangement for processing a dual-rail signal, the circuit comprising data inputs for feeding at least one dual-rail data input signal, and respective data outputs for outputting a dual-rail data output signal by using the at least one dual-rail data input signal. The circuit arrangement is designed in such a way that a dual-rail output signal with physical values corresponding to the physical values of the data input of the dual-rail data input signal is output at the data outputs when the dual-rail data input signal is fed to the data inputs with the same physical values for at least one signal pair.

DETAILED DESCRIPTION OF THE INVENTION

Figure 1:
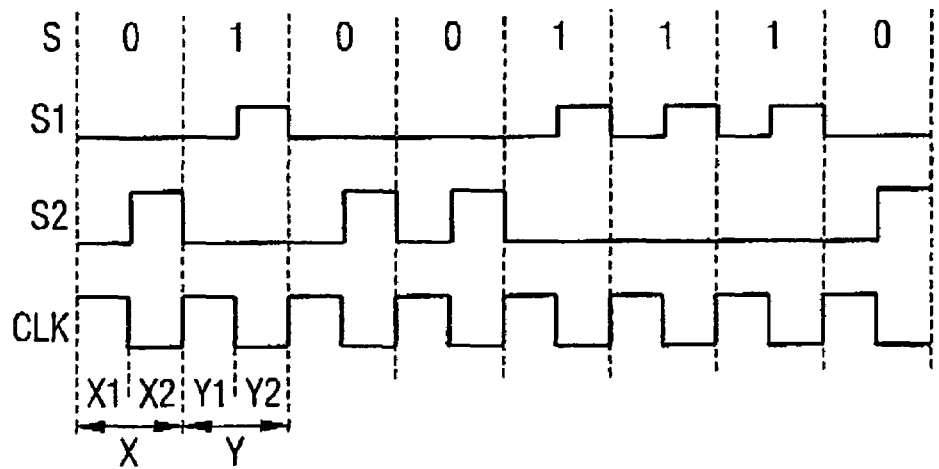
FIG. 1 shows a signal profile of a conventional dual-rail signal coded on two lines, with precharge.

A circuit arrangement is specified for processing a dual-rail signal that is safe from differential current profile analysis, produces no hazards at the outputs and can be implemented very simply in terms of circuit technology. The aim is also to specify a suitable method.

This is achieved according to the invention by a circuit arrangement of the type mentioned at the beginning which is defined in that two respective data inputs are provided for feeding at least one dual-rail data input signal, and two respective data outputs are provided for outputting a dual-rail data output signal by using the at least one dual-rail data input signal, and the circuit arrangement is designed in such a way that a dual-rail data output signal with the same logic values corresponding to the data inputs of the dual-rail data input signal is output at the data outputs when the dual-rail data input signal with the same logic values is fed to the data inputs.

The circuit arrangement according to the invention has the advantage that it is possible to dispense an additional precharge signal for each signal pair. A precharge need be produced only at a point of an integrated circuit that has a number of the inventive circuit arrangements, and be fed, for example, to the input of a so-called domino chain, in which a number of inventive circuit arrangements are connected in series, on one occasion and respectively before a new data item is driven to the data inputs of a first circuit arrangement of the domino chain. The precharge signal present at the data inputs and having the same logic value "0" or "1" for each data input is processed by the circuit arrangement as a normal data item such that in this case an output signal corresponding to the data input signals of the data inputs is generated at the outputs on the basis of the logic function of the circuit arrangement. Propagation time differences that occur also produce no undesired signal states at the output. Irrespective of the data to be processed, it is always the same number of logic "1" values and logic "0" values, or the same number of rising and falling edges, that are generated in each circuit arrangement. The circuit logic can be synthesized, and is therefore easy to implement. It offers the same security as dual-rail circuits with corresponding precharge. By virtue of the fact that all the lines are set to a standard value with a logic "1" or "0" before a new data item is driven, it is possible to dispense with a global precharging network or local precharging. Owing to the special structure of the basic elements of the circuit logic, all gates connected downstream of a gate to which a precharge/predischarge state is applied are likewise precharged with a precharge/predischarge state.

An inventive method for processing a dual-rail signal provides that at least one dual-rail data input signal is received at data inputs of a circuit arrangement, and a dual-rail data output signal is output at two data outputs by using the at least one dual-rail data input signal, each logic value of the data outputs corresponding to those of the data inputs when the same logic values, that is to say a predischarge state with the physical values "0/0" and a precharge state with the physical values "1/1" are present at the data inputs.

Figure 2A:
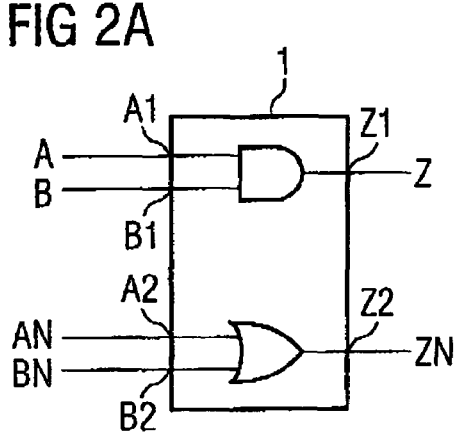
FIGS. 2A-2C show different embodiments of an inventive circuit arrangement.
Figure 2B:
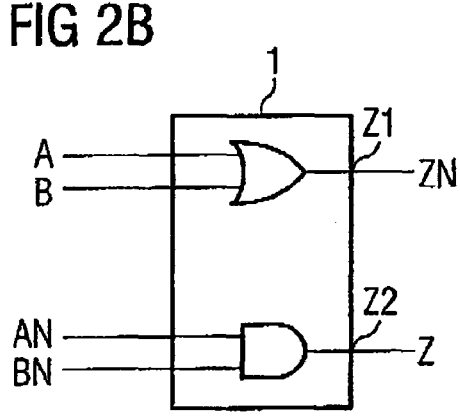
Figure 2C:
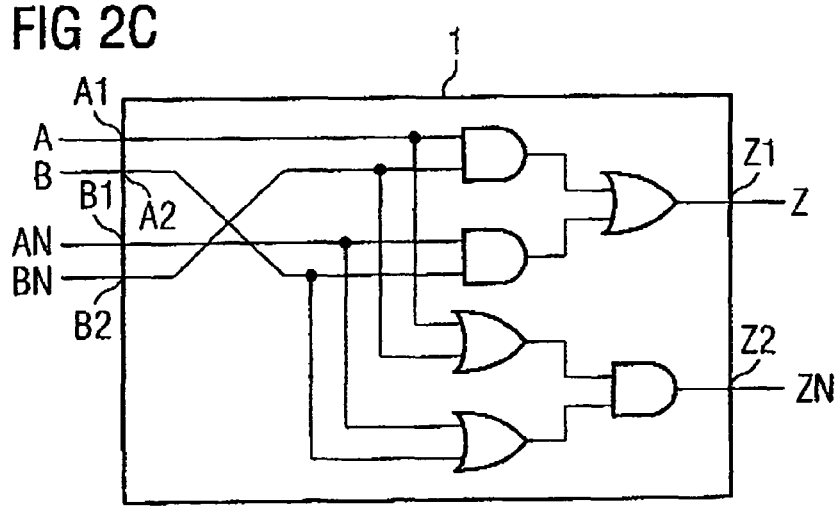

FIGS. 2A-2C show various exemplary embodiments of an inventive circuit arrangement. The circuit arrangement 1 is designed as an AND gate in the exemplary embodiment illustrated in FIG. 2a. In order to receive a first logic data input signal <A, AN> and a further logic data input signal <B, BN>, the AND gate has four inputs A1, A2, B1 and B2. Furthermore, two outputs Z1, Z2 are provided for outputting a dual-rail data output signal <Z, ZN>. The pairs <A, AN>, <B, BN>, <Z, ZN> form dual-rail signals such as were described in the introduction. The coding of a valid dual-rail signal is selected in the following exemplary embodiments as set forth below A valid logic signal with the value "1" has physical signal states with the value "1" for A, B and Z and physical signal states with the value "0" for AN, BN and ZN. A valid logic signal with the value "0" has physical signal states with the value "0" for A, B and Z and physical signal states with the value "1" for AN, BN and ZN.

Corresponding signal states for A/AN, B/BN with the values "0"/"0" or "1"/"1" are not valid logically permissible signals. For their part, because of the logic function of the inventive circuit arrangement 1, they lead at the outputs Z1, Z2 of the circuit arrangement to the same values Z/ZN="0"/"0" or "1"/"1". To this end, the circuit arrangement 1 is fed an invalid signal at the respective inputs A1, A2, B1, B2 before each data item to be driven and to be calculated, a data output signal corresponding to the logic values of the data input signal being switched through by the circuit arrangement 1 to the data outputs Z1, Z2 independently of gate functions to be implemented. The precharge signal or the predischarge signal present at the data inputs is relayed to the data outputs independently of the gate function. Data input signals with valid logic values are processed in accordance with the logic function of the circuit arrangement, and output at the outputs Z1, Z2 as dual-rail data output signals.

The mode of operation or the logic function of the exemplary embodiments illustrated in FIGS. 2b and 2c are valid in a way similar to the above description. In FIG. 2b, the circuit arrangement 1 is formed by an OR gate, and in FIG. 2c the circuit arrangement 1 is formed by an XOR gate, the circuit arrangements 1 of all the exemplary embodiments being formed, in turn, by a number of logic gates in each case.

Figures 3A, 3B, 4:
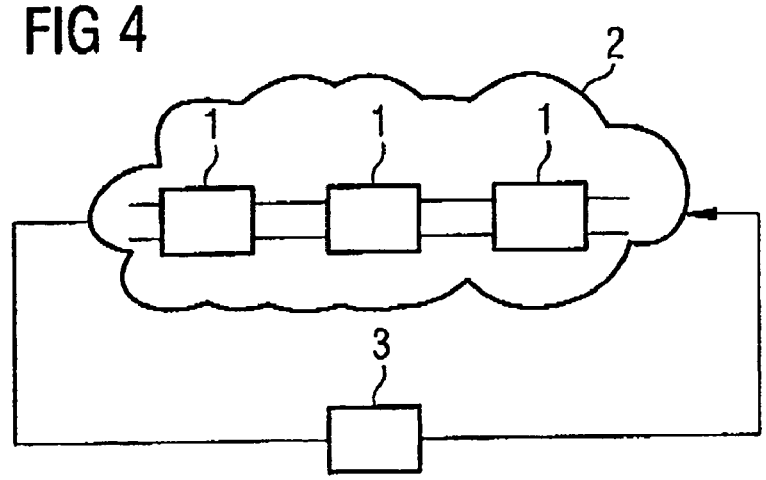
FIGS. 3A-3B show in the form of tables logic functions corresponding to the circuit arrangements illustrated in FIGS. 2A-2C.
FIG. 4 shows an arrangement with a number of inventive circuit arrangements that is fed a dual-rail signal via a circuit.

FIGS. 3A-3B show, with the aid of a table, a logic function corresponding to all the circuit arrangements illustrated in FIG. 2. As set forth in table 3a, it holds for valid logic input signals A, B that the data output signal Z assumes the logic value "0" if one of the data input signals A, B has the logic value "0". If both data input signals A, B have the logic value "1", the data signal Z will also assume a logic value "1".

A similar result holds for the conversion of the logic signals into dual-rail technology in accordance with the table 3b: the logically permissible values of the data input signals A, B are specified in rows 3 to 6 of the left-hand column, while the physical values corresponding thereto are specified in rows 3 to 6 of columns 2 to 5. Logic data input signals <A, AN>, <B, BN> are combined to form an output signal <Z, ZN> with the logic value "1", that is to say with physical values <1/0>, only in the case when the physical value "1" is present for the signals A and B, and the physical value "0" is present for the signals AN and BN.

An invalid logic input signal, in this case a predischarge signal, is present when the inputs A1, A2, B1, B2 are fed signals with the same value "0", that is to say A, AN, B and BN have the value "0", as specified in row 1, columns 2 to 5. In this case, the logic functions of the circuit arrangement generates a data output signal corresponding to the data input signals, as described previously. As evident from the table, it is possible by feeding an invalid logic signal to implement a dual-rail circuit with quasi predischarge, the circuit arrangement having the further property that undesired intermediate states, so-called hazards, are avoided.

FIG. 4 shows an arrangement 2 with a number of inventive circuit arrangements that is fed a dual-rail signal via a circuit 3. The arrangement 2 shows three circuit arrangements 1 that are linked in series in a domino chain and, for example, constitute a subset of a security-critical cell function in dual-rail technology in an integrated circuit (not illustrated here). The circuit 3 can be designed, for example, as a flipflop or a transition circuit from single-rail to dual-rail, and generates the dual-rail precharge signal which can be fed to one of the circuit arrangements 1 of the arrangement 2. This signal can be fed to the arrangement at any desired point such that the circuit arrangements 1 are fed fixed values of a precharge signal that are respectively output at the outputs of a circuit arrangement 1 with the same values, and are fed to the downstream circuit arrangement. It is thereby possible to generate a subset of circuit arrangements with the quasi precharge which propagates automatically within the arrangement, the dual-rail precharge signal being fed in, however, only via one source, the generating circuit.

The circuit arrangements according to the invention are not limited to the exemplary embodiments illustrated. These can, of course, exhibit various logic gates of different number.

What is claimed as new and desired to be protected by Letters Patent of the United States is:

1. A circuit arrangement for processing a dual-rail signal, the circuit arrangement comprising:
   input pairs configured to input at least one dual-rail input signal; and
   an output pair configured to output a dual-rail output signal using the at least one dual-rail input signal,
   wherein the dual-rail output signal has logical states corresponding to the logical states of the at least one dual-rail input signal when the at least one dual-rail input signal has a same logical state for each of the inputs of the input pairs, and
   wherein the at least one dual-rail input signal has a same logical state for each of the inputs of the input pairs applied before an input signal having different logical states for each of the inputs of each of the input pairs.

2. The circuit arrangement as claimed in claim 1, wherein the dual-rail output signal is output at the output pair in accordance with the logic function of the circuit arrangement when the at least one dual-rail input signal is input with different values at each of the inputs for each of the input pairs.

3. The circuit arrangement as claimed in claim 2, wherein a valid dual-rail signal has complementary signal levels.

4. The circuit arrangement as claimed in claim 1, wherein the circuit arrangement is formed by a logic gate.

5. The circuit arrangement as claimed in claim 4, wherein the logic gate is an AND gate.

6. The circuit arrangement as claimed in claim 4, wherein the logic gate is an OR gate.

7. The circuit arrangement as claimed in claim 4, wherein the logic gate is a NOR gate.

8. The circuit arrangement as claimed in claim 1, wherein a valid dual-rail signal has complementary signal levels.

9. An arrangement comprising:
   a plurality of the circuit arrangements as claimed in claim 1 linked in series in a domino chain; and
   a dual-rail precharge signal generation circuit designed to generate the at least one dual-rail input signal, which has a same logical state for each of the inputs of the input pairs, which can be fed to one of the plurality of circuit arrangements.

10. The arrangement as claimed in claim 9, wherein the dual-rail precharge signal generation circuit is a flipflop circuit.

11. The arrangement as claimed in claim 9, wherein the dual-rail precharge signal generation circuit is a single-rail to dual-rail transition circuit.

12. A method for processing a dual-rail signal, the method comprising:
   receiving at least one dual-rail input signal at input pairs of a circuit arrangement; and
   outputting a dual-rail output signal at an output pair by using the at least one dual-rail input signal,
   wherein the dual-rail output signal has logical states corresponding to the logical states of the at least one dual-rail input signal when the at least one dual-rail input signal has a same logical state for each of the inputs of the input pairs, and
   wherein the at least one dual-rail input signal has a same logical state for each of the inputs of the input pairs applied before an input signal having different logical states for each of the inputs of each of the input pairs.

13. The method as claimed in claim 12, wherein the dual-rail signal has complementary signal levels.

14. A circuit arrangement for processing a dual-rail signal, the circuit arrangement comprising:
   input pairs configured to input at least one dual-rail input signal; and
   an output pair configured to output a dual-rail output signal using the at least one dual-rail input signal,
   wherein the dual-rail output signal has logical states corresponding to the logical states of the at least one dual-rail input signal when the at least one dual-rail input signal has a same logical state for each of the inputs of the input pairs and
   wherein the at least one dual-rail input signal has a same logical state for each of the inputs of the input pairs applied before an input signal having different logical states for each of the inputs of each of the input pairs.

15. A circuit arrangement means for processing a dual-rail signal, the circuit arrangement means comprising:
   means for receiving at least one dual-rail input signal at input pairs of a circuit arrangement; and means for outputting a dual-rail output signal at an output pair using the at least one dual-rail input signal, wherein the dual-rail output signal has logical states corresponding to the logical states of the at least one dual-rail input signal when the at least one dual-rail input signal has a same logical state for each of the inputs of the input pairs, and wherein the at least one dual-rail input signal has a same logical state for each of the inputs of the input pairs applied before an input signal having different logical states for each of the inputs of each of the input pairs.

* * * * *